United States Patent [19]

Brown

[11] 4,438,065
[45] Mar. 20, 1984

[54] AIR EJECTION OF MOLDED CONTAINERS

[75] Inventor: Paul Brown, Orangeville, Canada

[73] Assignee: Husky Injection Molding Systems Ltd., Bolton, Canada

[21] Appl. No.: 355,891

[22] Filed: Mar. 8, 1982

[51] Int. Cl.³ .............................................. B29C 7/00
[52] U.S. Cl. ................................................. 264/335
[58] Field of Search ....... 264/335; 425/437, DIG. 102

[56] References Cited

U.S. PATENT DOCUMENTS 4,164,523  8/1979  Hanning ........................ 264/335 X
4,375,948  3/1983  von Holdt ........................... 425/437

Primary Examiner—Thomas P. Pavelko
Attorney, Agent, or Firm—Karl F. Ross; Herbert Dubno

[57] ABSTRACT

There is provided an improvement in an injection molding apparatus for a container, where the apparatus includes a core defining the interior of the container and first means within the core for initiating ejection of a molded container from the core. The improvement consists of second means adjacent the rim of the molded container for blowing a gaseous material toward the container rim, thereby completing ejection by urging the container away from the core.

3 Claims, 9 Drawing Figures

AIR EJECTION OF MOLDED CONTAINERS

FIELD OF THE INVENTION

My present invention relates generally to a method and an apparatus for molding containers, and as to do particularly with a method of ejecting a cup-shaped container from a mold core defining the interior of the container.

BACKGROUND OF THIS INVENTION

Recent developments in container-molding techniques have tended toward the use of extremely lightweight containers for packaging etc., for the obvious reasons of material saving and faster molding cycles. As containers become lighter in weight, the wall thickness of course diminishes.

By way of example, a "thin-wall" molded 500 g margarine container weighs 13.5 g and has a wall thickness of 0.45 mm. Such a container has a molding cycle of 3.2 seconds.

While it would be possible to reduce the wall thickness still further in order to produce even lighter parts, typically by selecting so-called easy-flowing molding materials such as polyethylene or polypropylene, a problem arises with extremely thin-walled containers in regard to the ejection of the molded workpieces from the core.

The conventional method for ejecting cup-shaped workpieces with closed front ends and rearwardly facing rims uses stripper rings, as shown in my prior U.S. Pat. No. 4,179,254, owned by the assignee of my present application, supplemented by additional features such as venting holes, slots or air valves in the mold core to break the vacuum created between the core and the molded part or workpiece during ejection, and to prevent collapsing of the workpiece at that stage.

The use of stripper rings to eject the container by pressing on its rim requires that the container be reasonably stiff so that it can be stripped off the core without buckling or even "folding over itself" like the finger of a tight-fitting glove during removal.

However, the demand for such stiffness to facilitate removal of the container from the core implies greater wall thickness, stiffer rather than easy-flowing materials, and longer cooling time. Any one of these factors contributes to slower cycles and higher costs.

An obvious answer to this difficulty, and one often attempted, has been to increase the air supply through the air vents or valves within the core designed to "blow" the workpieces off the core. This is sometimes successful especially with shallow workpieces and with strongly tapered ones that have a significant difference between top and bottom diameters. However, this method has not been satisfactory for deeper containers, particularly when their peripheral walls are nearly cylindrical, i.e. with a very small draft angle. In such cases, the air pressure inside the container tends to stretch its closed front end or bottom and thereby tighten the grip of the container on the core. The plastic may even burst at the cup bottom.

Another problem arising with this method is the so-called Venturi effect caused by the air escaping at the cup bottom and blowing out through the gap between the core and the plastic workpiece. At a certain point, the Venturi effect creates a suction acting on the workpiece so that it will advance only a short distance and then "hang" in midair on the core without falling free.

Occasionally this difficulty can be overcome by a large increase in airflow, but this expedient is usually confined to single-cavity molds. In multi-cavity molds, unless an extraordinarily large air supply is introduced, the first core to clear lets most of the air escape while the other cores are "starved" and fail to eject the workpieces. Also, the use of large volumes of high-pressure air is wasteful. Furthermore, such air ducting and valving near the top of the core presents severe restrictions in the layout of effective cooling channels near the tip of the core where cooling is most needed, thus resulting in poorer cooling and slower cycles.

One method already in practice for overcoming some of the deficiencies of the vents or valves in the top of the core (adjacent the bottom of the container) is to split the core at approximately ⅔ to ⅘ of its height and to make the tip of the core as a separate piece, either from mold steel or from such better heat-conducting materials as beryllium-copper. The seat of this core tip is so constructed that either a multitude of radial slots or a single continuous slot is created. By providing the slot with a width of approximately 0.015 mm, the slot becomes narrow enough to prevent plastic from flowing into it, but sufficient to let air under pressure pass through when required. The slots are connected by channels to the main air supply adjacent the core, and the channels are so located that they do not interfere with optimal layout for the cooling channels.

This blow-off directed onto the peripheral wall of the container (rather than its closed end) overcomes the problem of vents or valves on the top of the front face or core, by stretching the container away from the periphery of the core and loosening it even with a very small draft angle. However, this method does not solve the problem created by the Venturi effect. The workpieces move partly off the core and then "hang" as described earlier.

OBJECTS OF THE INVENTION

The general object of my present invention is to provide a method and an apparatus for overcoming the problems elucidated above. Experimental work has shown that a relatively light air jet directed into the gap between the core and the "hanging" workpiece is sufficient to break the Venturi effect and to eject the part. The technical problem, however, is to assure that such an air jet functions reliably under all conditions.

During the setup of the mold, but sometimes also on account of a malfunction of the molding machine, the mold may not be completely locked up during injection, or injection may occur prematurely, thus resulting in plastic "flashing" beyond the cavity. Such flashing plastic enters any void in its path and will obstruct any air-jet holes or ducts required for the blow-off function, resulting in costly downtime for repair and cleanout.

Accordingly, it is a more particular object of my invention to provide a reliable method and apparatus for completing the ejection of container-like workpieces from the core, utilizing an air jet or air stream to break the Venturi effect mentioned earlier.

SUMMARY OF THE INVENTION

An injection-molding apparatus for making cup-shaped containers according to my invention, which includes a core defining the interior of the container and first pneumatic means within the core for initiating ejection of a molded container from the core, comprises second pneumatic means adjacent the rim of the molded container for blowing a gaseous material such as air from an area adjacent the core forwardly toward the container rim upon incipient detachment of the container from the core surface, thereby completing ejection by urging the container away from the core.

A method according to my invention, for injection-molding a container in a cavity partly defined by a core conforming to the interior of the container, thus includes initiating the ejection of a molded container from the core and completing that ejection by blowing a gaseous material toward the container rim, more particularly into a gap generated by the initial ejection phase between that rim and the core.

BRIEF DESCRIPTION OF THE DRAWING

The above and other features of my invention will now be described in detail with reference to the accompanying drawing in which.

DETAILED DESCRIPTION

Figure 1:
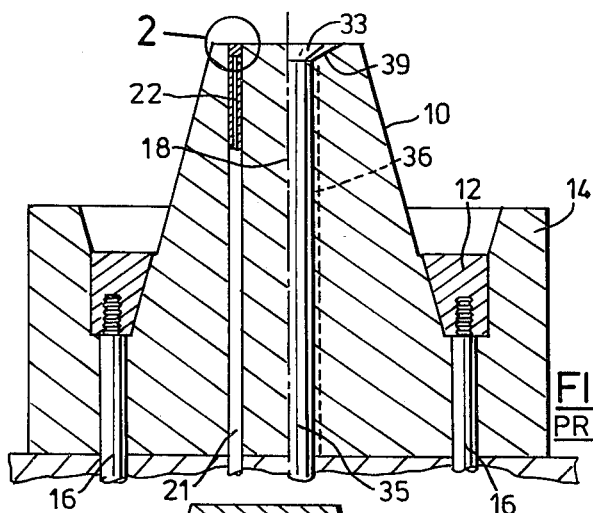
FIG. 1 is an axial sectional view of a conventional mold core.

Attention is first directed to FIG. 1, which illustrates a mold portion with a tapering core 10 surrounded by a stripper ring 12 of conventional construction and by a centering ring portion 14 for alignment with an associated cavity (not shown). The stripper ring is axially movable, in a complementary recess by, ejector pins 16 provided for this purpose. As can be seen in FIG. 1, this prior-art structure is such that a portion of the stripper ring (the innermost corner) actually defines a part of the rim of the container whereby axial movement of the stripper ring will push the entire container off the core.

Figure 2:
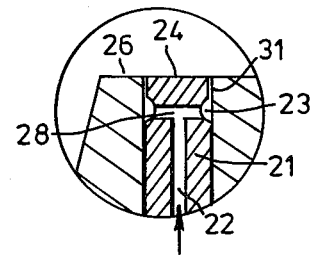
FIG. 2 is a view of a detail encompassed in a circle 2 of FIG. 1.

In the prior-art structure shown in FIG. 1, two possible means of introducing pressurized air between the core and the molded container, in order to at least initiate ejection thereof, are illustrated on opposite sides of a vertical centerline 18. To the left of this centerline, and as shown on a larger scale in FIG. 2, there is provided an elongated rod 21 having a central passageway 22, an annular groove 23 adjacent the rod end 24 which is flush with the top 26 of the core 10, a diametrical bore 28 connecting the passageway 22 with the groove 23, and an annular gap 31 allowing pressurized air coming along the passageway 22 to pass into the space between the molded cup-shaped workpiece and the small base 26 of the core 10. To the right of the centerline 18 in FIG. 1 is shown a valve 33 having a valve stem 35 which slides in a splined passageway located centrally of the core 10. One of the splines is identified by the numeral 36. The valve 33 has a sloping surface 39 meeting with a complementary surface of the core 10 in such a way that, when the valve is in its lowermost position as pictured in FIG. 1, air in the splines 36 cannot escape from the core 10. However, upon upward movement of the valve stem 35, the blockage of the air passageway constituted by the splines 36 is broken and pressurized air can enter the space between the molded cup bottom and the core 10, thus breaking the vacuum and at least initiating the ejection of the cup from the core.

Figure 4:
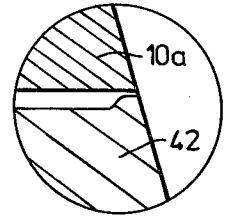
FIG. 4 is a view of a detail encompassed in a circle 4 of FIG. 3.
Figure 3:
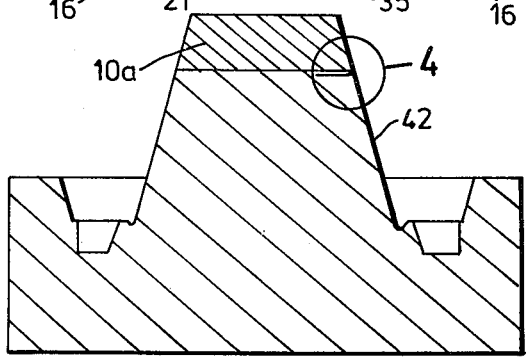
FIG. 3 is a view of another conventional mold core similar to that of FIG. 1.

FIG. 3 illustrates another prior-art structure, differing from that of FIG. 1 in that pressurized air for initiating ejection of the workpiece is admitted laterally through the tapered peripheral surface 42 of a core 10a, rather than axially through the top of the core. FIG. 4 is a sectional detail view illustrating that the actual gap or slot through which air passes out of the core 10a is quite small. It has been found that the maximum size of the slot should not exceed 0.015 mm, in order to prevent the liquid plastic from entering the slot.

As stated previously, the provision of these air-injection means does break the initial grip of the workpiece on the core and does initiate ejection. However, a Venturi effect typically arises which causes the workpiece to "hang" on the core and to fail to achieve complete ejection.

Figure 5:
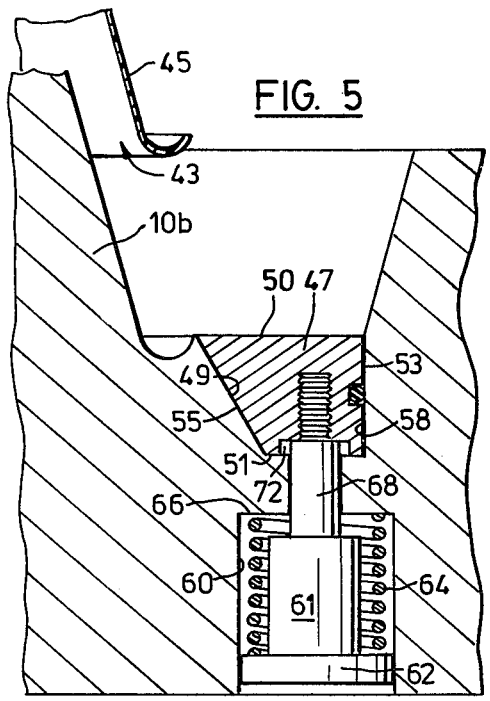
FIG. 5 represents an axial sectional view through a portion of an injection-molding apparatus adjacent the rim of a container cavity, showing one embodiment of this invention.

The problem relating to the Venturi effect can be overcome by the construction shown in FIG. 5, which includes a core 10b assumed to incorporate some pneumatic means for allowing initiation of the ejection of a molded container 45 from the core. Typically, this pneumatic means would include discharge ports in the core surface directing pressurized air toward the closed end of the workpiece to initiate the ejection, thus creating a gap 43 between the peripheral wall of container 45 and the core 10b. For example, the means illustrated in the prior-art structures shown in FIGS. 1-4 could be utilized to discharge an air flow from the interior of the mold core directly into the freshly molded cup-shaped container.

The improvement provided herein includes other pneumatic means adjacent the rim of the container 45 for blowing a gaseous material, typically pressurized air, toward that container rim, thereby completing ejection by urging the container away from the core.

In FIG. 5, the air-blowing means includes a ring member 47 which surrounds the core 10b adjacent the mold cavity, the ring member 47 being adapted to lodge in a complementary annular recess 49 in the core-forming mold portion and being resiliently biased toward that recess into a seating position. As can be seen in FIG. 5, the ring member 47 is trapezoidal in section and includes a top or front face 50, a bottom or rear face 51, an outer peripheral surface 53 parallel to its axis and thus to the axis of the core 10b, and an inner peripheral surface 55 tapering toward that axis converging in the same direction as the taper of the container 45. Because the recess 49 and the ring member 47 are complementary, the recess is bounded by a converging surface complementary to the inner ring peripheral surface 55; when the ring member 47 is fully lodged within the recess 49, these two surfaces mate together in airtight fashion. Thus, when the ring member 47 is in the position shown in FIG. 5, there is no possibility of air escaping from under the ring member 47 (i.e. adjacent the rear face 51) to the exterior.

FIG. 5 further shows a cylindrical bore 60 in which a piston 61 rides, the piston 61 having a lower flange 62 under downward pressure from a coil spring 64. The coil spring 64 has its other end in contact with the end wall 66 of the bore 60. Connected to the piston 61 is a shaft 68 which threadedly engages the ring member 47.

Thus, the action of the piston 61 and the spring 64 is to tend resiliently to retain the ring member 47 in position within the recess 49.

It is to be understood that a plurality of pistons 61 would be located around the ring member 47, preferably at least three in number, so as to support the same symmetrically.

Figure 6:
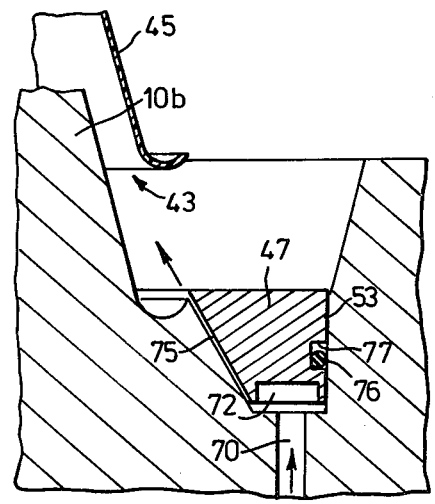
FIG. 6 is an axial sectional view similar to FIG. 5, but taken in a different axial plane.

Spaced circumferentially from the locations of the pistons 61 is at least one passageway 70 for the admission of pressurized air, as shown in FIG. 6. As also seen in both FIGS. 5 and 6, the ring member 47 has an annular channel or gallery 72 which allows air from the passageway 70 to be uniformly distributed around and underneath the ring member 47 when the same is in seated position as seen in FIG. 5.

By controlling the air pressure generated in the passageway 70 by a source symbolized by an arrow, the position of the ring member 47 can be altered. Thus, to allow the ring member 47 to seat in the recess 49, the air pressure in the passageway 70 is removed. However, upon pressurizing the air in the passageway 70 the ring member 47 is elevated and against the resistance of the springs 64 to allow a small gap 75 to arise between the peripheral surface 55 of the ring member 47 and the complementary wall of the recess 49. An O-ring seal 76 located in a rectangular-section gallery or groove 77 around the outer peripheral surface 53 of the ring member 47 prevents escape of pressurized air along surface 53 at all times.

The result of the upward movement of the ring member 47 as seen in FIG. 6 is to allow the pressurized air in the passageway 70 and the gallery or groove 72 to escape through the gap 75; the airstream is generally inwardly directed toward the bottom portion of the container 45 and specifically into the gap 43 between the container wall and the core 10b.

It will be appreciated that the very close fit in the position of FIG. 5 between the surfaces which define the gap or clearance 75 in FIG. 6 prevents molten plastic from entering the gap 75 in the event of flashing.

Thus, the procedure is first to mold the container 45 with the ring member 47 in the position shown in FIG. 5 and with no air pressure in the passageway 70. Then, after the container 45 has solidified and is to be stripped from the core 10b, the initial ejection with air flowing through passageways within the core is accomplished to bring the workpiece to the position shown in FIG. 6, thus defining the gap 43. Finally, air under pressure is admitted to passageway 70, thus raising the ring member 47 and allowing pressurized air to escape along the continuous annular clearance 75 defined between the surface 55 of the ring member 47 and the complementary wall of the recess 49. This stream of air is symmetrically directed into the gap 43, breaks the Venturi effect, and removes the container 45 completely from the core 10b.

Figure 7:
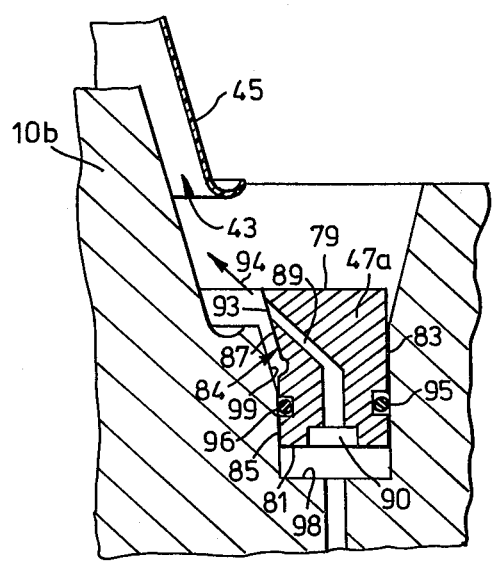
FIG. 7 is an axial sectional view similar to FIG. 5, showing another embodiment of this invention.

FIG. 7 illustrates a second embodiment of the invention in which the construction of the ring member 47a has been altered as compared with that shown for member 47 in FIGS. 5 and 6. The ring member 47a has a front face 79, a rear face 81, an outer peripheral surface 83 parallel to its axis, and an inner peripheral surface 84 divided into a cylindrical rearward zone 85 parallel to outer surface 83 and a frustoconical forward zone 87 which tapers in the same direction as the molded container 45. An internal passageway 89 connects an annular groove or gallery 90 in the rear face 81 of the ring member 47a with an outlet 93 in the frustoconical zone 87 of the ring member 47a. It will be noted that the obliquity of the passageway 89 adjacent the outlet 93 is such as to provide an inwardly converging airstream, identified by the numeral 94, adapted to enter the gap 43 already separating the molded container 45 from the core 10b.

Two O-ring sliding seals 95 and 96 are lodged in respective rectangular-section galleries in the peripheral surfaces 83 and 84 of the ring member 47a to provide a complete seal against the escape of air between the cylindrical outer surface 83 and the complementary boundary of the recess 98 receiving that ring member, on the one hand, and on the other hand between the cylindrical zone 85 of the inner surface 84 of the ring member 47a and the corresponding boundary of the recess 98.

FIG. 7 further shows that, when the ring member 47a is at its lowermost position, the frustoconical forward zone 87 of its inner surface 84 seats against a corresponding surface 99 of the recess 98, thus closing the outlet 93 and preventing egress of air. This closure also prevents entry of molten plastic into the outlet 93. However, when an increase of air pressure against the rear face 81 of the ring member 47a raises same to the position shown in FIG. 7, this movement unblocks the outlet 93 and allows the pressurized air to form the inwardly converging stream 94 which enters the gap 43 in order to complete ejection of the molded container 45.

Figure 8:
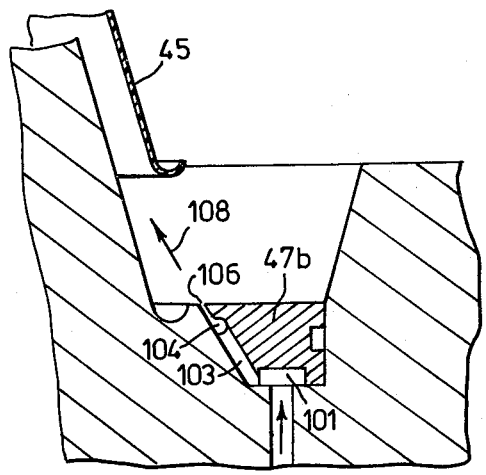
FIGS. 8 and 9 are views similar to those of FIGS. 5 and 7, showing further modifications.

In FIG. 8 a stationary ring 47b is shown provided with an annular gallery 101 having one or more communicating passageways 103 terminating at an annular groove 104 from which a continuous gap 106 of small dimension allows egress of air to form an inwardly converging air-stream 108. As previously stated, the gap 106 should have a maximum dimension not greater than 0.015 mm, in order to prevent entry of molten plastic.

With the embodiment of FIG. 8, air pressure is supplied to the annular gallery 101 after the container 45 has been partly ejected to the position shown in FIG. 8.

Figure 9:
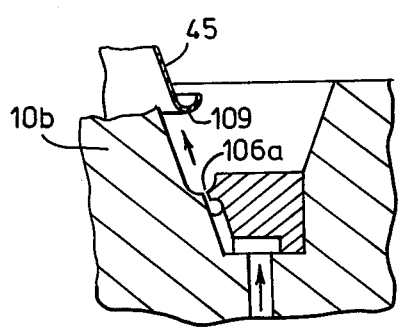

In FIG. 9 I have shown a ring member similar to that of FIG. 8, with the exception that a gap 106a opens directly into an annular groove around the core which defines the outer surface of the rim 109 of the container 45. Thanks to the small size of the gap 106a (not greater than 0.015 mm), the hot molten plastic present during formation of the container 45 will not enter the gap 106a to block the air passage.

I claim:

1. A method of operating an injection-molding apparatus for ejecting a cup-shaped workpiece with a closed front end and a rearwardly facing rim from a tapering core around which the workpiece has been molded with said rim resting on an annular zone surrounding said core, comprising the steps of:
    (a) directing a first stream of a gaseous fluid from the surface of said core into the interior of a freshly molded workpiece for initiating a separation of said workpiece from said core, thereby creating a peripheral gap therebetween; and
    (b) thereafter directing a second stream of a gaseous fluid from said annular zone forwardly toward said rim for completing the separation of said workpiece from said core.

2. A method as defined in claim 1 wherein said second stream is directed substantially along the periphery of said core into said peripheral gap.

3. A method as defined in claim 1 or 2 wherein the gaseous fluid of steps (a) and (b) is pressurized air.

* * * * *